United States Patent

Hoving et al.

[11] Patent Number: 5,572,895
[45] Date of Patent: Nov. 12, 1996

[54] METHOD OF MUTUALLY DISPLACING AT LEAST TWO PARTS OF AN ACTUATOR, AND ACTUATOR FOR USE IN SUCH A METHOD

[75] Inventors: Willem Hoving; Johannes A. M. Van Hout; Marcellinus A. M. Grooten; Piet C. J. Van Rens; Marinus P. Koster; Marten Westerhof, all of Eindhoven, Netherlands

[73] Assignee: U.S. Philips Corporation, New York, N.Y.

[21] Appl. No.: 286,124

[22] Filed: Aug. 4, 1994

[30] Foreign Application Priority Data

Aug. 11, 1993 [BE] Belgium .............................. 09300828

[51] Int. Cl.$^6$ .................................................. B21D 37/16
[52] U.S. Cl. .................... 72/342.94; 72/342.1; 360/109; 29/603.01
[58] Field of Search ............................ 72/342.94, 342.1; 219/121.64, 121.65, 121.66, 121.77; 29/603; 264/229, 231; 360/105, 109

[56] References Cited

U.S. PATENT DOCUMENTS 4,877,175  10/1989  Jones et al. ...................... 219/121.65
5,341,256   8/1994  Murata et al. .......................... 360/75
5,347,415   9/1994  Murata et al. ......................... 360/109
5,359,203  10/1994  Hashii et al. ...................... 219/121.64

FOREIGN PATENT DOCUMENTS 0488658   6/1992  European Pat. Off. ................. 360/77
05020652   1/1993  Japan .

Primary Examiner—Daniel C. Crane
Assistant Examiner—Ed Tolan
Attorney, Agent, or Firm—Ernestine C. Bartlett

[57] ABSTRACT

A method for the mutual displacement of at least two parts of an actuator interconnected by a bridge, and such an actuator. The bridge which connects the two parts and extends parallel to a main surface is locally heated through and through with a temperature gradient which is minimized transverse to the main surface, and is subsequently cooled down whereby the length of the bridge between the parts is reduced owing to the plastic deformation which occurs, so that the parts are displaced relative to one another in a direction parallel to the main surface.

15 Claims, 6 Drawing Sheets

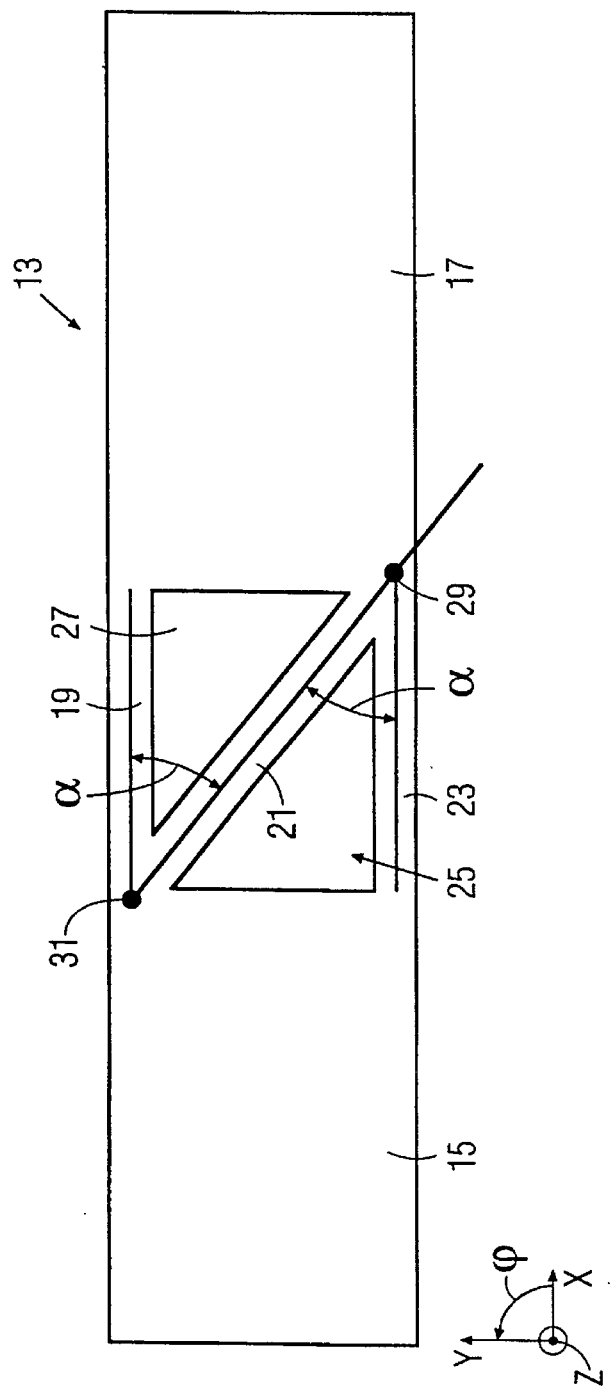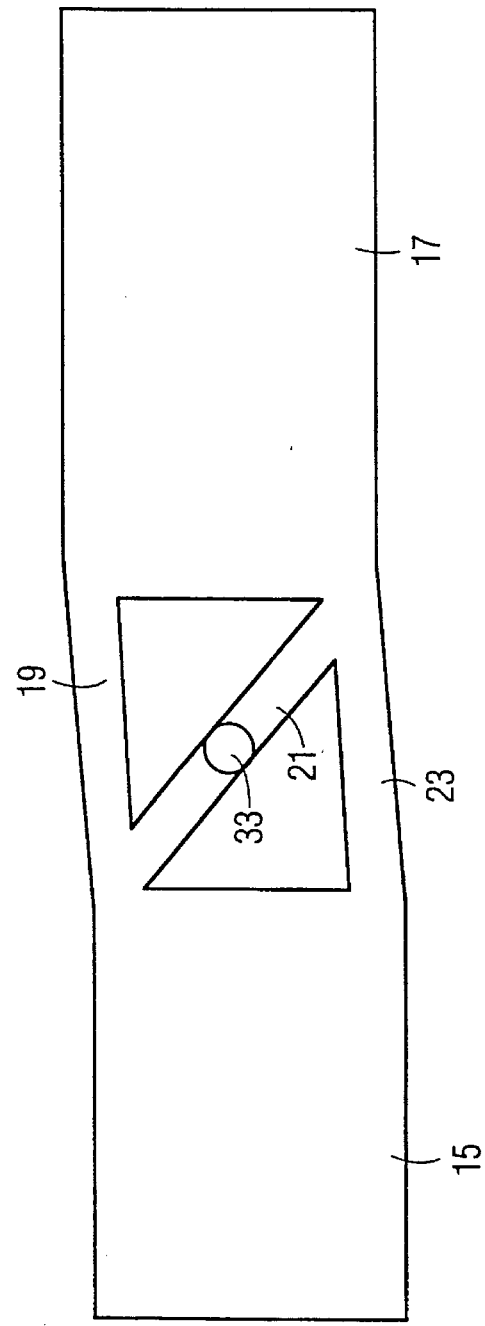

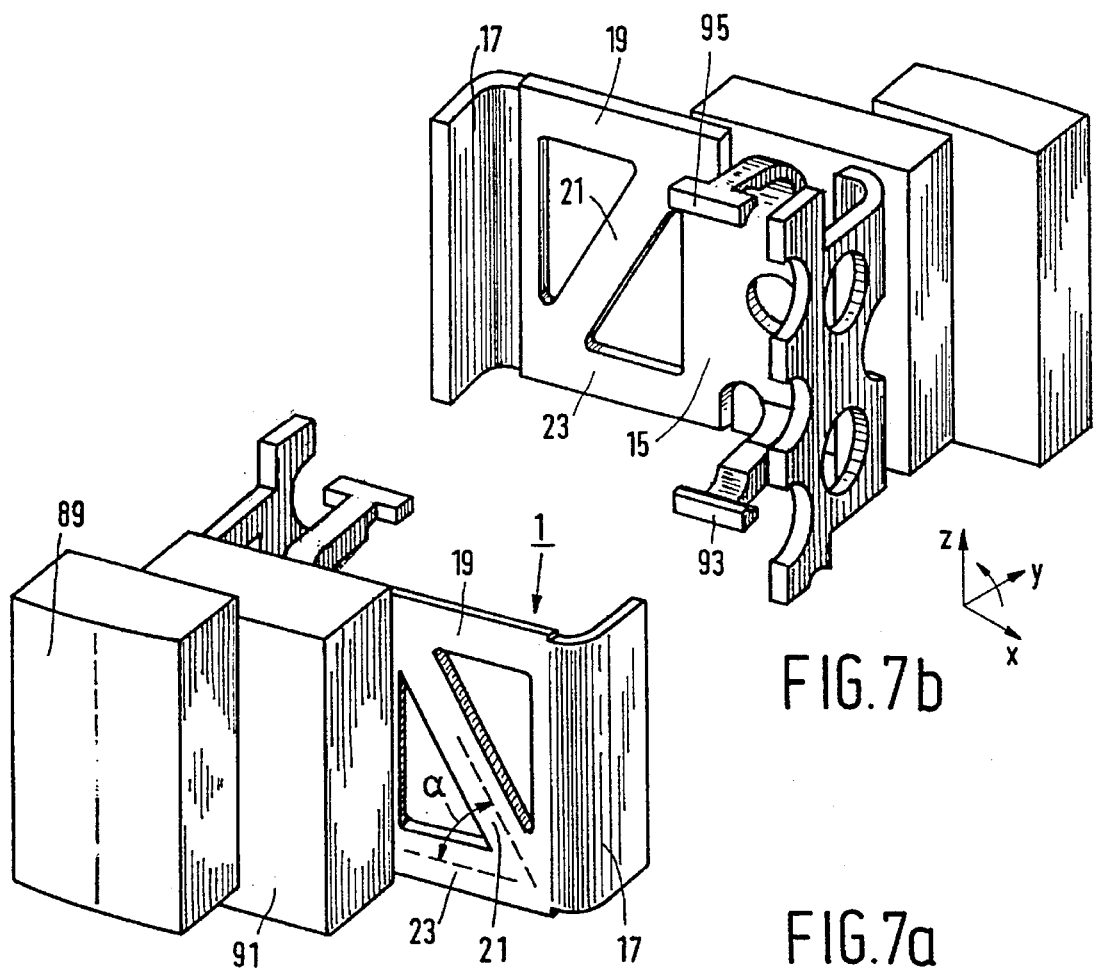
FIG.7b
FIG.7a
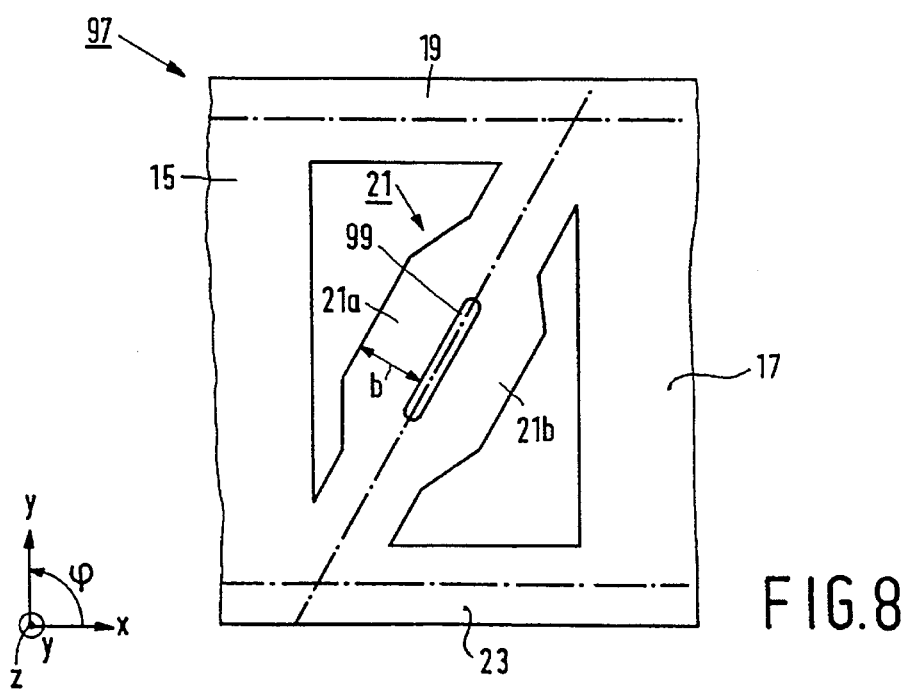
FIG.8

METHOD OF MUTUALLY DISPLACING AT LEAST TWO PARTS OF AN ACTUATOR, AND ACTUATOR FOR USE IN SUCH A METHOD

BACKGROUND OF THE INVENTION

The invention relates to a method of mutually displacing at least two parts of an actuator through local heating and cooling-down of the actuator, whereby the actuator is plastically deformed locally and the parts are moved relative to one another.

The invention also relates to an actuator suitable for use in such a method.

In the case of a method and actuator as disclosed in European Patent Application EP-A2 0488658, two interconnected plate-shaped parts are positioned in relation to one another in that one of the plate-shaped parts is locally heated by a laser and is then allowed to cool down, whereby the plate-shaped part is plastically deformed locally. The laser is aimed transversely at a main surface of the plate-shaped part and heats the plate-shaped part over part of its thickness. The plastic deformation bends the plate-shaped part in a direction transverse to the main surface of the plate-shaped part. Impacts or vibrations in the direction in which the plate-shaped part has been bent will apply a bending or torsional load to the plate-shaped parts. The stiffness of the plate-shaped parts against bending and torsion is comparatively low, so that the mutual positioning accuracy in the direction in which the plate-shaped part has been bent is comparatively low during an impact load or vibrations.

SUMMARY OF THE INVENTION

The invention has for its object to provide a method whereby parts of an actuator are displaced relative to one another in a certain direction, while the actuator has a comparatively great stiffness and a comparatively high positioning accuracy in this direction.

The method according to the invention is for this purpose characterized in that a bridge connecting the two parts and extending parallel to a main surface is locally heated through and through with a temperature gradient which is minimized transversely to the main surface, and is subsequently cooled down whereby the length of the bridge between the parts is reduced because of the plastic deformation which takes place, so that the parts interconnected by means of the bridge are displaced relative to one another in a direction parallel to the main surface. Since the bridge is locally heated uniformly through its entire thickness transversely to the main surface, the bridge is not bent in a direction transverse to the main surface but is shortened in the longitudinal direction of the bridge which is directed parallel to the main surface. The bridge is loaded with a tension or compression force in the case of impacts or vibrations in the direction in which the bridge was shortened. The stiffness of the bridge against tension and compression is comparatively great. The parts may be displaced over a greater distance in that the bridge is heated and cooled down several times. The bridge may be actively cooled by means of, for example, a water jet, but the simplest way is to have the bridge cool down by exposing it to the ambient air.

In an embodiment of the method according to the invention several bridges interconnecting the parts with one another are heated and cooled down. This increases the range over which and/or the number of directions in which and/or the number of degrees of freedom with which the parts of the actuator can be displaced.

By alternately or simultaneously shortening a number of bridges situated at a comparatively great distance from one another, it is possible to translate and/or rotate the parts relative to one another, whereby various degrees of freedom are obtained and displacements in opposed directions can be realized.

The range over which parts of the actuator are displaceable is increased still further in another embodiment of the method according to the invention wherein at least two bridges which are situated at a comparatively short distance from one another are alternately shortened, the one bridge preventing an undesirable displacement of the parts relative to one another while the other bridge is being locally heated through its full width and thickness.

During local heating of a first bridge through the full thickness and width of this bridge, thermal expansions lead to stresses in the material of the bridge. In the heated material, these stresses exceed the lowered yield point of the material, and the heated material is plastically deformed. In the non-heated surrounding material of the actuator, said stresses only lead to an elastic deformation of the material. The yield point of a material is that pressure above which the material is plastically deformed. The yield point becomes lower as temperature rises. The second, non-heated bridge prevents the parts from moving freely relative to one another during this phase. During cooling-down, the plastically deformed material of the first bridge is contracted. After cooling-down, the first bridge has a smaller length than previously and the parts are moved towards one another, whereby the second bridge will be under a compression strain and the first bridge under a tension strain. Then the second bridge is heated. As soon as the material of the second bridge has been sufficiently heated, the parts move further towards one another as a result of the tension present in the first bridge. Any other mutual displacements of the parts are prevented by the first bridge. The material of the second bridge is plastically deformed during heating owing to the thermal stresses and the tension in the first bridge, and after cooling-down the second bridge has become shorter and the parts are drawn still further towards one another, while the first bridge is under compression strain and the second bridge under tension strain. This process may be repeated several times, so that the parts can be moved relative to one another over a much greater distance (by a factor 20 to 100) than if only one bridge were used.

Another object of the invention is to provide an actuator which is suitable for use in a method according to the invention and which obviates the disadvantage of the known actuator. The actuator, which is provided with at least two parts which are displaceable relative to one another by a plastic deformation of the actuator upon local heating and cooling-down of the actuator, is for this purpose characterized in that the parts are interconnected by means of a bridge and are displaceable relative to one another in a direction parallel to a main surface, which bridge is directed parallel to the main surface and can be heated and cooled down through its full thickness transversely to the main surface, whereby the length of the bridge between the two parts can be reduced as a result of the plastic deformation which takes place. The displacement of the parts of the actuator in a direction parallel to the main surface is possible because the parts are interconnected by a bridge which is deformable in the longitudinal direction parallel to the main surface.

In another embodiment of the actuator according to the invention several bridges interconnect the parts. The range over which and/or the number of directions in which and/or the number of degrees of freedom with which the parts of the actuator are displaceable are increased thereby.

In yet a further embodiment of the actuator according to the invention the actuator comprises at least two substantially parallel bridges and a third bridge which is situated diagonally between the parallel bridges, the third bridge being arranged between ends of the parallel bridges and enclosing acute angles with the parallel bridges. With such an actuator, the parts can be displaced parallel to one another and can be rotated relative to one another through shortening of the third bridge or one of the parallel bridges. When both parallel bridges are shortened, the third bridge becomes relatively longer and a displacement is obtained which corresponds substantially to a displacement which would be obtained upon lengthening of the third bridge. Rotations in opposed directions can be obtained in that one or the other parallel bridge is shortened.

In a further embodiment of the actuator according to the invention characterized each part is connected to two guides by means of two hinges, the four hinges forming virtual vertices of a parallelogram, whereby the parts are displaceable parallel to one another. When a bridge is plastically deformed, the parts hinge relative to the guides and the parts are displaced parallel to one another.

In a still further embodiment of the actuator according to the invention the second part is enclosed by the first part in the main surface and is connected to the first part by means of a number of bridges which are fastened to mutually opposed sides of the second part. Depending on the number of bridges, the second part may be displaced in substantially all directions parallel to the main surface.

BRIEF DESCRIPTION OF THE DRAWING

The invention will be explained in more detail with reference to the drawing, in which FIGS. 2a and 2b are plan views of a first embodiment of an actuator according to the invention, FIG. 2a showing the actuator not yet plastically deformed and FIG. 2b showing, the actuator plastically deformed, FIGS. 7a and 7b show an application of the actuator according to the invention shown in FIG. 2a in front and rear elevation, and FIG. 8 shows a sixth embodiment of an actuator according to the invention.

DETAILED DESCRIPTION OF THE PREFERRED EMBODIMENTS

Figure 1:
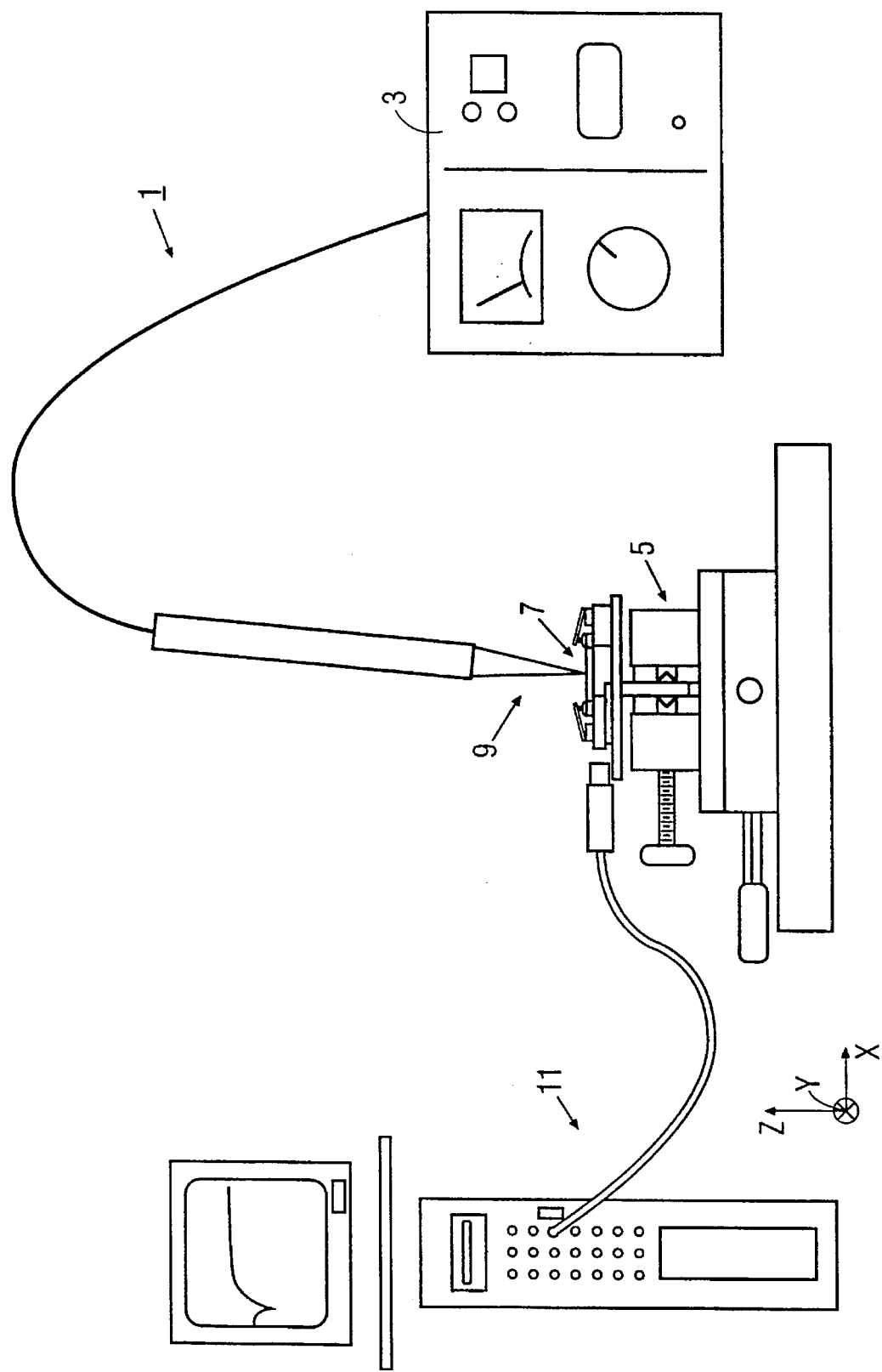
FIG. 1 is a side elevation of a device suitable for carrying out the method according to the invention.

Corresponding components have been given the same reference numerals in the various Figures.

FIG. 1 shows a device 1 which is provided with a Nd: YAG laser 3 and an x,y table 5. An actuator 7 to be adjusted is laid in the desired position below the laser beam 9 derived from the laser 3 by means of the x,y table 5 and a camera (not shown). The displacement of the actuator 7 is measured with a position transducer 11.

FIG. 2a shows an actuator 13 according to the invention which comprises a first and a second plate-shaped part 15, 17 interconnected by three plate-shaped and strip-shaped bridges 19, 21, 23. The bridges 19 and 23 are directed in parallel and have the same length. The third bridge 21 is arranged diagonally between the parallel bridges 19, 23 and is connected to these bridges and to the parts 15, 17. The third bridge 21 encloses an acute angle $\alpha$ with the parallel bridges 19, 23. The bridges 19, 21, 23 and the parts 15, 17 form a truss of which a first triangle 25 is formed by the first part 15 and the bridges 21, 23 and a second triangle 27 is formed by the second part 17 and the bridges 19, 21.

The operation of the actuator is as follows. The laser 3 (see FIG. 1) directs a laser beam 9 transversely onto a main surface situated in the x,y plane with a comparatively long pulse time so that one of the bridges is locally uniformly heated through and through in a z-direction through its entire thickness in a first location. The temperature gradient across the thickness is a minimum here. During heating, the stresses arising from the thermal expansion exceed the yield point of the heated material of the bridge, and a plastic deformation of the bridge occurs. Then the laser is switched off and the bridge cools down. After cooling-down, the bridge has a smaller length. The length change is a few micrometers. When the bridge is subsequently heated very locally in another, second location and cooled down again, the bridge again becomes slightly shorter. If the bridge were to be heated in the same location, the built-up contraction stresses would disappear in that location. During the second cooling-down, contraction stresses are built up again so that the bridge is locally shortened. The total effect, however, is that the bridge has not become shorter but has the same length as before the second heating. Preferably, the bridge is not heated over the full width of the bridge. Heating over the full width of the bridge in fact involves the risk that the parts 15, 17 are shifted relative to one another owing to external loads the moment the bridge is heated. When a portion of the width of the bridge is heated, the non-heated portions prevent such a shift.

When the length of the bridge 19 is reduced, the first triangle 25 remains unchanged and the second part 17 is rotated relative to the first part 15 about the virtual pivot point 29 in the positive $\phi$-direction.

When the length of the bridge 23 is reduced, the second triangle 27 remains unchanged and the second part 17 is rotated relative to the first part 15 about the virtual pivot point 31 in the negative $\phi$-direction.

FIG. 2b shows the actuator 13 in which the bridge 21 is locally heated and cooled down at the area of the laser spot 33. The parallel bridges 19, 23 and the parts 15, 17 act as in a parallelogram here. The second part 17 is translated relative to the first part 15 in the positive y-direction. A displacement in the negative x-direction also takes place during this, but this displacement is small compared with the displacement in the positive y-direction.

When the two parallel bridges 19, 23 are shortened simultaneously, the third bridge 21 becomes relatively longer and the second part 17 is translated relative to the first part 15 in the negative y-direction.

By heating and cooling down the bridges several times, it is possible to displace the parts 15, 17 over a few tens of micrometers relative to one another and to rotate them relative to one another through 2.5 to 5 mrad.

The parts 15, 17 are displaced relative to one another in a plane parallel to the plate surface of the plate-shaped actuator 13. Plate-shaped elements have a comparatively great stiffness against dimensional changes in these directions. As a result of this, and because the actuator 13 is constructed as a truss consisting of triangles 25, 27, the actuator 13 has a comparatively great stiffness against displacements and loads in the x-, y- and φ-directions.

Figure 3:
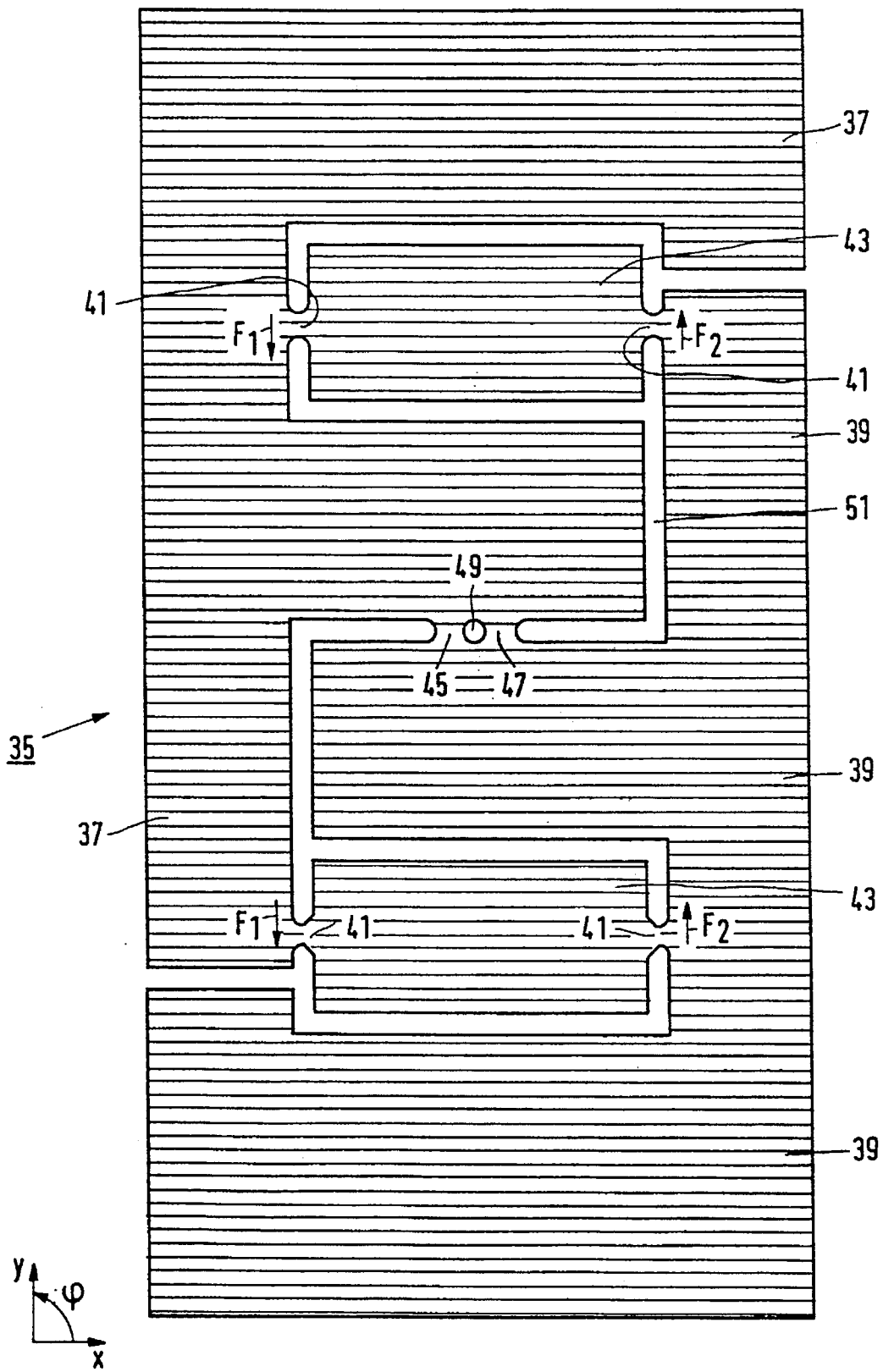
FIG. 3 is a plan view of a second embodiment of an actuator according to the invention.

FIG. 3 shows an actuator 35 according to the invention which comprises a first and a second plate-shaped part 37, 39 which are connected to two plate-shaped guides 43 by means of four elastic plate hinges 41. The guides 43 form a parallel guiding for the parts 37, 39. The parts 37, 39 are in addition interconnected through two plate-shaped bridges 45, 47 which are separated by an opening 49. The actuator 35 was manufactured from a single plate in which slots 51 and the opening 49 were provided by, for example, stamping, etching, laser cutting, or spark erosion. The elastic hinges 41 form the four vertices of a parallelogram, so that the parts 37, 39 are displaceable relative to one another in the y-direction and, to a very limited extent, in the x-direction.

The operation of the actuator 35 is as follows. During local heating of a first bridge 45 over the full thickness and width of this bridge 45, stresses arise in the material of the bridge 45 owing to the thermal expansion. In the heated material, these stresses exceed the lowered yield point of the material and the heated material deforms plastically. In the non-heated surrounding material of the actuator, said stresses cause an elastic deformation only of the material. The second, non-heated bridge 47 prevents the parts from freely shifting relative to one another during this phase. The plastically deformed material of the first bridge 45 contracts during cooling-down. After cooling-down, the first bridge 45 has a smaller length than before, and a force $F_1$ is exerted on the first part 37 in the negative y-direction, while a force $F_2$ is exerted on the second part in the positive y-direction. The forces $F_1$, $F_2$ result in a moment of forces on the guides 43, which are thus rotated in the positive φ-direction, so that the parts 37, 39 are moved towards one another. This brings the second bridge 47 under compression strain and the first bridge 45 under tension. Subsequently, the second bridge 47 is heated. The moment the material of the second bridge 47 has been sufficiently heated, the parts move towards one another still further as a result of the tensional stresses still present in the first bridge 45. Any other mutual displacements of the parts are prevented by the first bridge 45. The material of the second bridge 47 is plastically deformed during heating owing to the thermal stresses and the tension in the first bridge 45, and after cooling-down the second bridge 47 has become shorter and forces $F_1$, $F_2$ are exerted again on the parts 37, 39, whereby said parts are moved towards one another again. Now the first bridge 45 will be under compression strain and the second bridge 47 under tension. This process is repeated through heating of the same locations of the bridges 45, 47 each time until the desired displacement has been realized. The one bridge prevents the other bridge, which is being heated, from assuming the length which it had before being heated the previous time.

Figure 4:
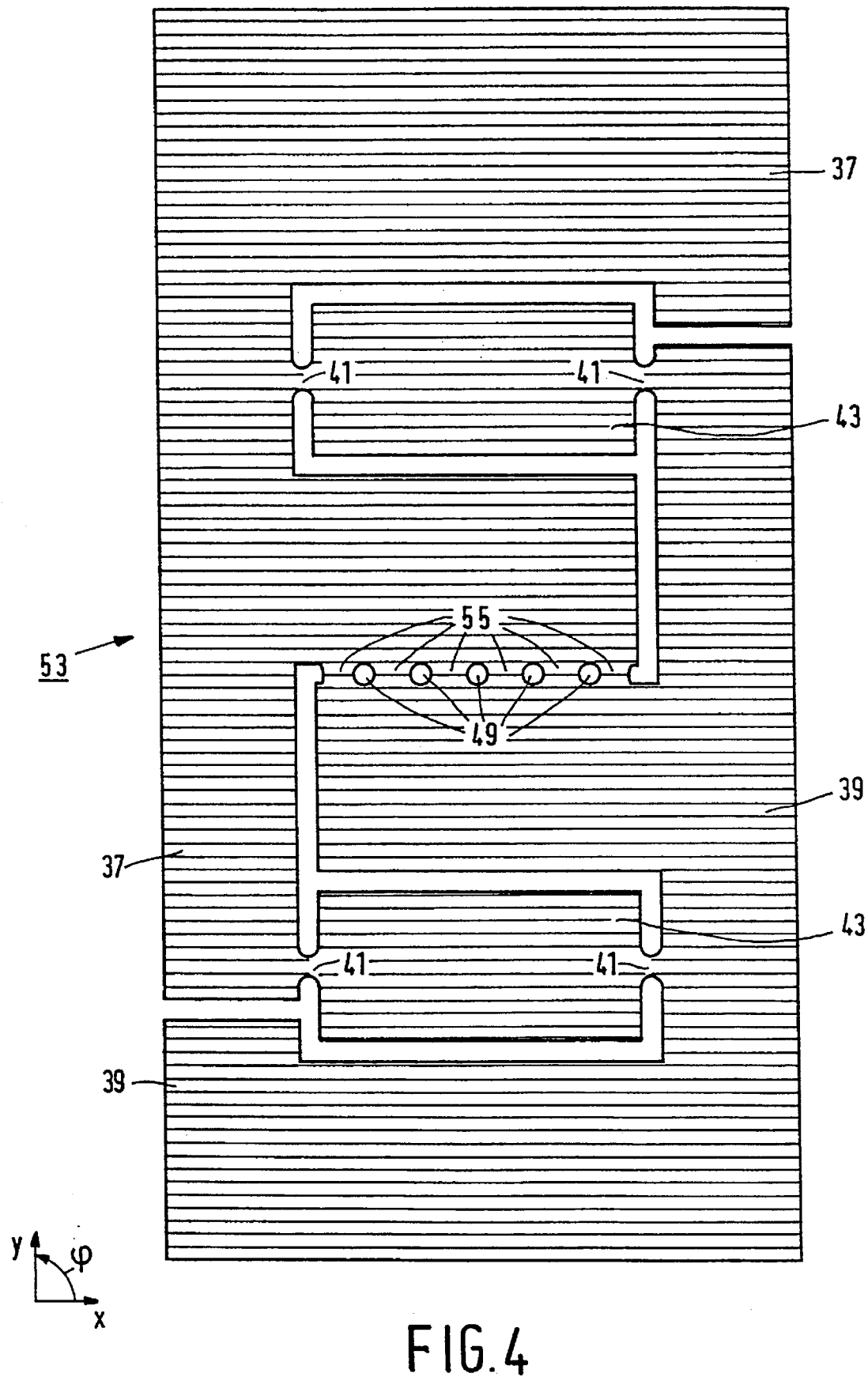
FIG. 4 is a plan view of a third embodiment of an actuator according to the invention.

FIG. 4 shows an actuator 53 which is almost identical to the actuator 35 shown in FIG. 3. The parts 37, 39, however, are here interconnected by six bridges 55. When one bridge is shortened, the occurring mutual displacement of the parts 37, 39 will be smaller than in the actuator 35 shown in FIG. 3 because there will be five bridges trying to prevent this displacement instead of one bridge. A smaller displacement of the actuator can be realized in this way. Owing to the greater number of bridges, the actuator 53 is more rigid than the actuator 35.

Figure 5:
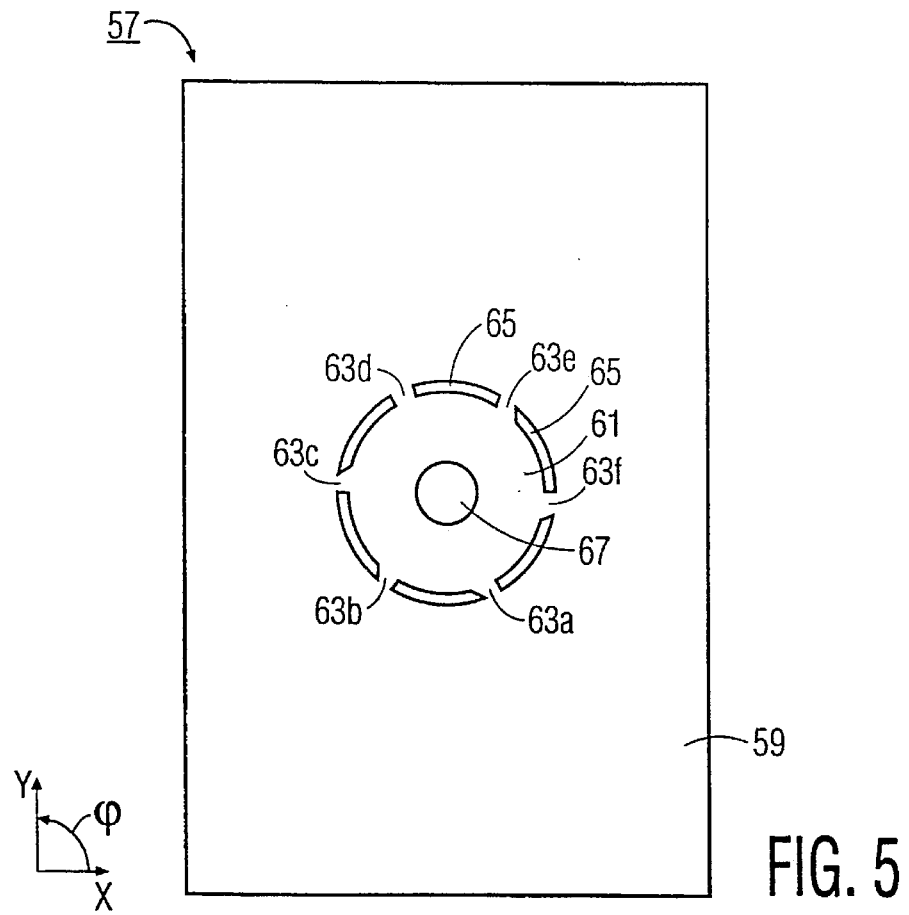
FIG. 5 is a plan view of a fourth embodiment of an actuator according to the invention.

FIG. 5 shows an actuator 57 according to the invention which comprises a first and a second plate-shaped part 59, 61 interconnected by means of six plate-shaped bridges 63. The actuator 57 was manufactured from one plate in which elongate openings 65 were provided by stamping or spark erosion, separating the bridges 63 from one another. The openings 65 are situated on a circle. A hole 67 is provided in the second part 61, which hole is in the center of the circle. An object to be positioned may be fastened to the second part 61 through this hole 67. By heating and subsequently cooling down, for example, the bridge 63a, the hole 67 is displaced in the direction of the bridge 63a. When another bridge 63 is subsequently heated and cooled down, the hole 67 is moved in the direction of this other bridge. Each bridge can be shortened only once. The other bridges will pull away the hole 67 from a certain bridge when this bridge is heated for a second time, and in effect nothing will have happened after cooling-down.

Figure 6:
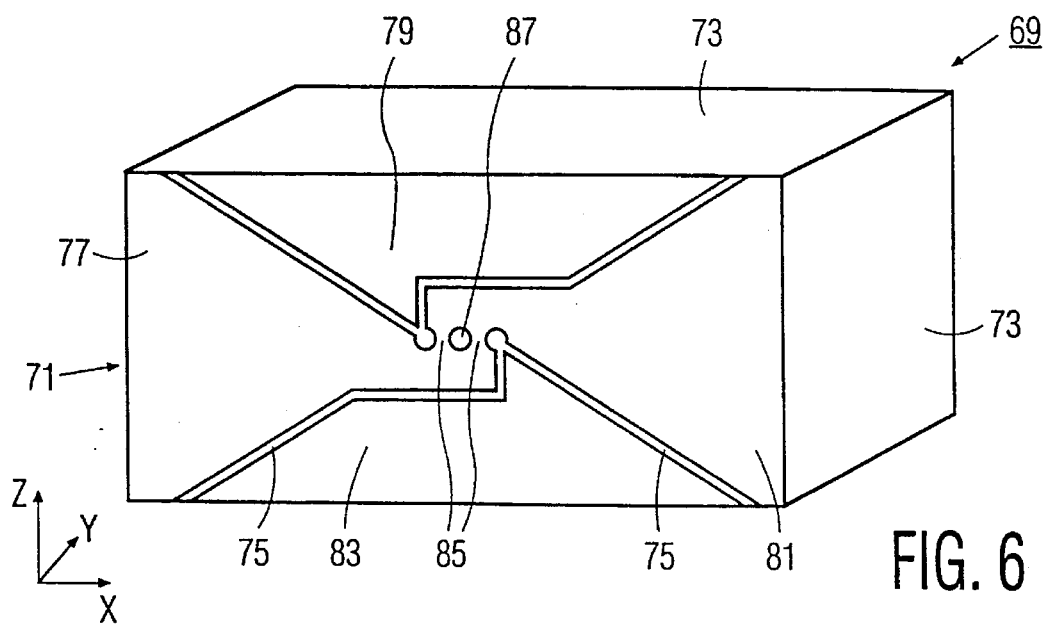
FIG. 6 shows a fifth embodiment of an actuator according to the invention.

FIG. 6 shows a rectangular box 69 of which one wall 71 is constructed as an actuator. The walls 71, 73 are made from thin flexible plates. The wall 71 is divided into four surfaces 77, 79, 81, 83 by means of slots 75, the surfaces 77, 81 being interconnected by two bridges 85. The bridges 85 are mutually separated by an opening 87 in the wall 71. By heating and subsequent cooling-down of the bridges 85, the bridges shrink and the surface 81 is displaced towards the surface 77 in the negative z-direction. The remaining walls 73 of the box 69 are bent by this, and the box 69 is twisted about the x-axis. Such an actuator may be used for housings of components.

FIGS. 7a and 7b show a front and rear elevation, respectively, of an application of an actuator 13 as shown in FIG. 2. FIGS. 7a and 7b show a magnet head 89 which is fastened to the actuator 13 via a support 91. The magnet head, which is used in cassette recorders, must be positioned relative to a tape (not shown) at a desired height (z-direction) and at a desired so-called azimuth angle (φ-direction). Part 17 of the actuator 13 is connected to the housing (not shown) of the magnet head. Part 15 of the actuator 13 is provided with two bent legs 93, 95 which are connected to the housing of the magnet head 89. The magnet head 89 has a satisfactory stiffness in the y-direction thanks to the legs 93, 95. The legs 93, 95 are provided with elastic hinges whereby the legs 93, 95 may be readily bent in the z-direction upon a displacement of part 15 of the actuator 13 in this direction. The actuator 13 has the following dimensions: the bridges 19, 23 have a length of 2 ram, and a width of 0.6 ram, the angle α is 60°, and the thickness of the actuator is 0.3 min.

FIG. 8 shows an alternative embodiment of the actuator 13 shown in FIG. 2a. The actuator 97 differs from the actuator 13 shown in FIG. 2a in that the bridge 21 is built up from two parallel bridges 21a and 21b separated by an elongate opening 99. The parts 15, 17 can be displaced relative to one another over a greater distance in the y-direction than in the actuator 13 shown in FIG. 2a in that the bridges 21a, 21b are alternately heated over their full width b in a manner corresponding to that applying to the bridges 45, 47 shown in FIG. 3. The bridges 21a, 21b are alternately loaded with compression and with tension in this case.

Instead of repeated heating and cooling-down of a bridge, it is also possible to use an adaptation of the size of the laser spot for realizing a greater or smaller displacement. An adjustable laser spot size may be obtained in that a laser spot of small diameter is displaced relative to the bridge during heating, whereby the effect is obtained of a laser spot having a greater diameter. Another possibility is to use a quickly adjustable beam widener or to defocus the laser beam. Yet another possibility is to build up the laser spot from separate short laser pulses of, for example, 8 ms immediately next to one another. Since the spots are provided in such quick succession, one large hot spot is obtained.

The bridges may be made from any material which has a reasonable heat conduction and is plastically deformable, such as metal or synthetic resin.

The bridges may be heated simultaneously provided the parts cannot be displaced relative to one another in an undesirable manner owing to an external load or force.

The temperature of the heated material of a metal bridge lies between 800° and 1500° C.

The actuator according to the invention is suitable for positioning comparatively small components of products, for example, for positioning a CCD chip, a DCC head, or components of an electron gun.

We claim:

1. A method of mutually displacing at least two parts of an actuator through local heating and cooling-down of the actuator, whereby the actuator is plastically deformed locally and the parts are moved relative to one another, characterized in that a bridge connecting the two parts and extending parallel to a main surface is locally heated substantially uniformly through substantially its entire thickness transversely to the main surface with a temperature gradient which is minimized transversely to the main surface, and is subsequently cooled down whereby the length of the bridge between the parts is reduced as a result of the plastic deformation which takes place, so that the parts interconnected by means of the bridge are displaced relative to one another in a direction parallel to the main surface.

2. A method as claimed in claim 1, characterized in that several bridges interconnecting the parts with one another are heated and cooled down.

3. A method as claimed in claim 2, characterized in that at least two bridges which are situated at a comparatively short distance from one another are alternately shortened, the one bridge preventing an undesirable displacement of the parts relative to one another while the other bridge is being locally heated through its full width and thickness.

4. An actuator provided with at least two parts which are displaceable relative to one another by a plastic deformation of the actuator upon local heating and cooling-down of the actuator, characterized in that the parts are interconnected by means of at least one bridge and are displaceable relative to one another in a direction parallel to a main surface, which at least one bridge is directed parallel to the main surface and which bridge upon application of local heat and cool-down is heated and cooled down substantially uniformly through substantially its entire thickness transversely to the main surface with a temperature gradient which is minimized transversely to the main surface, whereby, after said application of heat and cool down, the length of said at least one bridge between the two parts is reduced as a result of the plastic deformation which takes place.

5. An actuator as claimed in claim 4, characterized in that several bridges interconnect the parts.

6. An actuator as claimed in claim 5, characterized in that the actuator comprises at least two substantially parallel bridges and a third bridge which is situated diagonally between the parallel bridges, the third bridge being arranged between ends of the parallel bridges and enclosing acute angles with the parallel bridges.

7. An actuator as claimed in claim 4, characterized in that each part is connected to two guides by means of two hinges, the four hinges forming virtual vertices of a parallelogram, whereby the parts are displaceable parallel to one another.

8. An actuator as claimed in claim 5, characterized in that the second part is enclosed by the first part in the main surface and is connected to the first part by means of a number of bridges which are fastened to mutually opposed sides of the second part.

9. An actuator as claimed in claim 5, characterized in that each part is connected to two guides by means of two hinges, the four hinges forming virtual vertices of a parallelogram, whereby the parts are displaceable parallel to one another.

10. An actuator provided with at least two parts which are displaceable relative to one another by a plastic deformation of the actuator upon local heating and cooling-down of the actuator, characterized in that the parts are interconnected by means of at least one bridge and are displaceable relative to one another in a direction parallel-to a main surface, wherein a second part is enclosed by a first part in the main surface and is connected to the first part by means of a number of bridges which are fastened to mutually opposed sides of the second part.

11. An actuator provided with at least two parts which are displaceable relative to one another by a plastic deformation of the actuator upon local heating and cooling-down of the actuator, characterized in that the actuator comprises a first and second plate-shaped part interconnected by at least two substantially parallel bridges and a third bridge situated diagonally between the two parallel bridges, the third bridge being connected to the two parallel bridges and the plate-shaped part, the third bridge enclosing acute angles with the two parallel bridges.

12. An actuator provided with at least two parts which are displaceable relative to one another by a plastic deformation of the actuator upon local heating and cooling-down of the actuator, characterized in that the actuator comprises a first and second plate-shaped part each connected to two plate-shaped guides by means of two elastic hinges, the four hinges forming vertices of a parallelogram, the plate-shaped parts being interconnected through at least two plate-shaped bridges which are separated by an opening.

13. An actuator as claimed in claim 12, wherein the plate-shaped parts are each connected to three plate-shaped bridges.

14. An actuator provided with at least two parts which are displaceable relative to one another by a plastic deformation of the actuator upon local heating and cooling-down of the actuator, characterized in that the actuator comprises a first and second plate-shaped part interconnected by six plate-shaped bridges, whereby elongate openings separate the bridges one from the other, said openings being situated on a circle, a hole provided in the second plate-shaped part being in the center of the circle.

15. An actuator provided with at least two parts which are displaceable relative to one another by a plastic deformation of the actuator upon local heating and cooling-down of the actuator, characterized in that the actuator comprises at least two walls made of flexible plates, at least one wall being divided into four surfaces by means of slots, two of the surfaces being interconnected by two bridges, the bridges being mutually separated by an opening in said at least one wall.

* * * * *